(12) United States Patent
Gomez et al.

(10) Patent No.: US 6,267,793 B1
(45) Date of Patent: Jul. 31, 2001

(54) SNAP-IN, SNAP-OUT CLEAN ROOM CEILING SYSTEM

(75) Inventors: Tony Gomez, Chino; Peter Jeanseau, San Clemente, both of CA (US)

(73) Assignee: HEPA California, Anaheim, CA (US)

( * ) Notice: Subject to any disclaimer, the term of this patent is extended or adjusted under 35 U.S.C. 154(b) by 0 days.

(21) Appl. No.: 09/458,333

(22) Filed: Dec. 10, 1999

Related U.S. Application Data (60) Provisional application No. 60/166,122, filed on Nov. 18, 1999, and provisional application No. 60/148,143, filed on Aug. 10, 1999.

(51) Int. Cl.[7] ............................. B01D 29/52; B01L 1/04
(52) U.S. Cl. ............................. 55/385.2; 55/422; 55/418; 55/480; 55/484; 55/504; 55/508; 454/187
(58) Field of Search .................. 55/385.2, 418, 55/420, 422, 484, 504, 508, 480; 454/187; 73/40.7, 40, 52

(56) References Cited

U.S. PATENT DOCUMENTS

| | | | | |
|---|---|---|---|---|
| 3,280,540 | * | 10/1966 | Soltis ................................. | 55/385.2 |
| 3,576,096 | * | 4/1971 | Rivers ................................ | 55/504 |
| 3,782,082 | * | 1/1974 | Smith et al. ...................... | 55/484 |
| 4,217,122 | * | 8/1980 | Shuler .............................. | 55/480 |
| 4,548,068 | * | 10/1985 | Gualtieri et al. ................. | 73/40.7 |
| 4,666,477 | * | 5/1987 | Lough ............................. | 55/385.2 |

* cited by examiner

Primary Examiner—David A. Simmons
Assistant Examiner—Robert A. Hopkins
(74) Attorney, Agent, or Firm—Louis J. Bachand (57) ABSTRACT

A clean room ceiling filter system has a filter unit received by a filter unit receiving unit, the filter unit and filter receiving unit define cooperating latch and keeper structure that deflects into fastened engagement and releases from within the clean room by simultaneous pivoting of each latch member of each set of latch members. A tubular rod within the filter unit allows dispensing test material onto the filter media from within the clean room and adjustment of an air flow damper also from within the clean room.

32 Claims, 7 Drawing Sheets

SNAP-IN, SNAP-OUT CLEAN ROOM CEILING SYSTEM

REFERENCE TO RELATED APPLICATIONS

This application claims the benefit of United States Provisional Application Serial No. 60/148,143 filed Aug. 10, 1999, and further claims the benefit of United States Provisional Application Serial No. 60/166,122, filed Nov. 18, 1999.

BACKGROUND OF THE INVENTION

1. Field of the Invention

This invention relates to clean room systems and, in particular, clean room ceiling systems. "Ceiling" herein includes not only horizontal upper walls and lower walls or floors of rooms but also vertical side walls. The terms lower, upper, above, below, and the like and their cognitives have reference to a conventional ceiling installation and are to be understood as relative terms when the "ceiling" is other than above the workspace. The invention further relates to filter units comprising a frame and filter media sealed in the frame, support structure comprising a support such as a grid or other array of support elements, or a filter unit receiver of one or more interconnected modular bays congruent and close-fitting with the filter units, and plural spring-loaded latch and keeper fasteners for separably attaching the filter units into the support structure with a simple push-in, pull-out movement.

2. Related Art

Clean room ceilings are known and typically comprise one or more filter units supported by a structure that is separate or integral with the filter units. Facile installation and removal of the filter units, which are replaced from time-to-time, is of increasing importance. Replacement from the room side of the filter system is desirable for increased convenience and lower cost. The need to air-tightly mount the filter units in their filter support structure has lead to the use of supports that have flanges or lips against which the filter units rest in sealed condition. Passing the flanges to insert filter units can be problematic. More recently, it has been demonstrated that sealing tape can be used at the interstices of the filter arrays to block unfiltered air flow, eliminating in some systems the use of support flanges, and easing the insertion problem.

In clean room systems that use one or a plurality of single filter units each in its own enclosing frame so that there is no large plenum over a number of filters as in grid systems, the testing of the filters for integrity involves the addition of a test material (an aerosol typically) to the air stream entering the filter. In a further aspect the present invention provides a novel and highly convenient way to accomplish this test. In addition, the filter units of the invention further permit adjustment of incoming air flow by selective positioning of a damper from the room side of the filter unit.

SUMMARY OF THE INVENTION

Mounting the filter units in their support structure directly, easily and without tilting is desirable, and can now be achieved with a filter unit mounting system that reacts to the presence of the filter. Desirably such a system also permits the separation of the filter unit from the support readily and from the room side.

It is an object of the invention to provide an improved clean room ceiling system. It is a further object to provide an integrated filter unit and support structure that preserves the ultimate qualities of present clean room ceiling design, but adds the dimension of ease of installation and removal. A further object includes providing cooperating fastener components on the filter units and support structure that enables snap-in installation, and snap-out removal, typically by a single worker for even unwieldy size filter units. A still further object is to achieve snap connection with low cost parts. Another object is to provide a common unlatching system for one or all together of the cooperating fastener components. A specific object is the provision of room side replaceable filter system in which individual filter units equipped with cooperating pivoting latches are insertable into supports carrying cooperating pins that serve to pivotally deflect the latches to pass and then upon a spring-powered return engage in hooked relation the pins against separation of the filter unit from the support, the latches being reversely pivotable to pass the pins in filter unit releasing relation from the support in pairs on each side of the filter unit, the members of the pairs being connected with a tether such as a cable responsive to movement of one latch to actuate the other so that a one-hand unlatching step is possible on each side of the filter unit. Further objects include provision of a tubular element within the filter units to which a damper plate is mountable in the incoming air flow, the element being rotatable to adjust the proximity of the damper to the air flow inlet and thus to modify the air flow. The same tubular element can be used to inject a test material into the air flow above the filter media for testing of the efficiency and integrity of the filter unit. In general the invention has as an object the complete redesign of conventional clean room ceilings and filter units so that the filter units snap in and out of their supports and in between times are positively retained at multiple positions about their periphery.

These and other objects of the invention, to become apparent hereinafter, are realized in a clean room ceiling system comprising a generally closed space having a workspace and an air supply thereto, the system including a filter unit having a predetermined shape and comprising a frame and filter media sealed within the frame, and a filter unit support adjacent the frame for supporting the filter unit adjacent the workspace, the filter unit support comprising plural sets of cooperating latch and keeper fasteners carried by the filter unit frame and the filter unit support, each latch having a shoulder by which the latch is deflectable in pivoting relation by its cooperating keeper to pass the keeper, each latch being biased against the deflection and adapted to return to an undeflected position in keeper-engaged relation to block separation of the filter unit from the filter unit support after passing the keeper.

In this and like embodiments, typically, the latch is spring-loaded and mounted for pivoting movement, the latch having structure by which the latch is reversely deflectable from outside the filter unit support to disengage from the keeper and release the filter unit from the filter unit support, the latch structure being accessible from within the workspace, the filter unit frame defines a plurality of outward facing sides, at least two of the sides carrying a latch or keeper in latching relation with a keeper or latch respectively carried by the filter unit support, the filter unit frame defines a plurality of outward facing sides, the support is disposed circumjacent to the filter unit frame and has a plurality of inward facing sides opposite each of the filter unit outwardly facing latch or keeper carrying sides, the inward facing sides carrying a latch or keeper in latching relation with a keeper or latch respectively carried by the outward facing sides in latch registerable relation, each filter unit frame outward facing side carries a spring-loaded latch, said latch shoulder being a leading shoulder, each latch pivoting in a plane parallel to the filter unit side carrying the latch, the inward facing support sides each carrying a keeper opposite each the latch, each keeper comprising a pin projecting normal to the filter unit support and arranged to engage the latch leading shoulder in deflecting relation, the latch being hook-shaped to capture the pin following the latch shoulder passing the pin in filter unit supporting relation on the pin, the filter unit sides carrying the latches have a front face normal to the sides and facing the workspace, each latch having a trailing shoulder having a flange arranged to separably engage the side front face in the latched condition of the filter unit in the filter unit support, there is also included a tether secured to the latch structures for simultaneously pivoting multiple ones of the latches from pin engagement by pivoting one latch, sets of the latch structures being tethered by a common tether for simultaneous pivoting from pin engagement by the tether.

In a preferred embodiment, the filter unit frame is rectangular and has first and second pairs of outwardly facing sides, the first and second pairs of sides having respectively first and second sets of pivoting latches mounted thereon in longitudinally distributed relation, the filter unit support having first and second sets of pins mounted thereon in cooperating relation with the first and second sets of latches, first and second tethers separately connecting the members of the first and second sets of latches respectively for pivoting together each of the latches within each set in pin separating relation responsive to the pivoting of one latch, the filter unit support structure sides have an external U-shaped flange comprising a stub wall extending parallel to the structure side and spaced therefrom across a gap, the pin being supported in place by the structure side to project into the interior of said support structure, the filter unit supported latch comprises a latch member pivoted on the filter unit side, the latch member comprising a blade defining at one end the latch leading shoulder and at the other end a flange defining the latch trailing shoulder, and defining a pivot locus between the ends, the latch member blade engaging the pin within said support structure interior, the filter unit sides have a U-shaped flange opposing the support structure interior, the filter unit side flanges carrying the latches in pin registered relation, and there is also included a tether connected between latches.

In its method aspects, the invention provides the method of mounting filter units in a clean room ceiling system including maintaining a filter unit and filter unit support structure in air filtering relation to a workspace within a clean room, the support structure having a wall, the air filter unit having an opposing wall to the support structure wall, coupling the filter unit to the support structure with cooperating latch and keeper structure including a latch that is deflectable upon contact with the keeper to pass the keeper and shaped to latch onto the keeper once past the keeper in filter unit supporting relation on the support structure.

In this and like embodiments, typically, the method further includes reversely deflecting the latch to disengage the filter unit from the support structure.

In a further method aspect, the invention provides a method of testing high efficiency particulate air filtering media in a filter unit mounted in a clean room, the filter unit having a tubular rod extending through its media, including introducing a test material into the rod at a rod inlet at the down stream side of the media, and releasing the test material onto the upstream side of the media at a rod outlet, while passing air from the upstream side to the downstream side of the media.

The invention further provides a unique filter unit for use in clean room ceiling systems, the clean room filter comprising a filter unit for mounting in a support supported by a support surface, the filter unit having outwardly facing side walls and filter media sealed with the frame, the side walls and support defining cooperating fasteners comprising latches and keepers adapted to support the filter unit at the support and spaced from the support surface.

In this and like embodiments, typically, the filter units further comprises multiple packs of filter media, a divider between adjacent packs of filter media supporting a bracket, an air inlet, a bushing mounted to the bracket, a rod threaded or otherwise journaled in the bushing for shifting axially relative thereto, a damper carried on the rod between the air inlet and the filter media packs, the rod being adapted to adjust the position of the damper relative to the filter media packs by a force applied from a clean room in which the filter unit is disposed. In a further embodiment, the rod is tubular and extends through the divider between the filter media packs and terminates at the air inlet, the tubular rod being adapted to dispense filter test material onto the upstream side of the filter media packs adjacent the air inlet.

In these and like embodiments, typically, the filter unit side walls carry latches adapted to engage keepers carried by the support, each latch has structure by which the latch is reversely deflectable from outside the filter unit to disengage from a keeper and release the filter unit from a filter unit support, the latch structure being located to be accessible from within the workspace, the filter unit frame defines a plurality of outward facing sides, at least two of the sides carrying a latch or keeper for latching with a keeper or latch respectively carried by a filter unit support, the filter unit frame outward facing side carries a latch having a leading shoulder and a trailing shoulder, each latch pivoting in a plane parallel to the filter unit side carrying the latch for latching with an opposing keeper carried by a support, each latch is generally hook-shaped and adapted to cooperate with a keeper comprising a pin projecting normal to the filter unit, the latch being constructed and arranged such that its leading shoulder engages pin in deflecting relation and captures the pin following the latch leading shoulder passing the pin in filter unit supporting relation on the pin, the filter unit sides carrying the latches have a front face normal to the sides and facing the workspace, each the latch trailing shoulder having a flange arranged to separably engage the side front face in the latched condition of the filter unit in a support, and there is also included a tether secured between adjacent latches for pivoting the latches together from pin engagement, with sets of latches tethered to a common tether for simultaneous pivoting from pin engagement of each member of the set upon pivoting of any member of the set.

In a further embodiment, the filter unit side walls define a rectangular frame, the frame having first and second pairs of outwardly facing sides, the first and second pairs of sides having respectively first and second sets of pivoting latches mounted thereon in longitudinally distributed relation for locking on first and second sets of keepers carried on a support structure, and first and second tethers separately connecting the first and second sets of latches respectively for pivoting together each of the latches within each set in pin separating relation, the filter unit supported latch comprises a latch member pivoted on the filter frame side, the latch member comprising a blade defining at one end the latch leading shoulder and at the other end a flange defining the latch trailing shoulder, and defining a pivot locus between the ends, the filter frame sides have a U-shaped flange containing a sealant such as a foam material gasket or a sealing gel and adapted to receive a sealing edge of an opposing flange carried by a filter support, and there is also included a tether connected to each latch for pivoting with the pivoting of one tethered latch each other latch tethered thereto.

In yet a further embodiment, the clean room filter further comprises multiple packs of filter media, a divider between adjacent packs of filter media supporting a bracket, an air inlet, a rod threaded or otherwise journaled in the bushing for shifting axially relative thereto, a damper carried on the rod between the air inlet and the filter media packs, the rod being adapted to adjust the position of the damper relative to the filter media packs by a force applied from a clean room in which the filter unit is disposed.

In a still further embodiment, the clean room filter comprises multiple packs of filter media, a divider between adjacent filter media packs, an air inlet, a tubular rod extending through the divider and terminating at the air inlet, the tubular rod being adapted to dispense filter test material onto the upstream side of the filter media packs adjacent the air inlet.

This last embodiment in its method aspects includes the method of testing high efficiency particulate air filtering media in a filter unit mounted in a clean room, the filter unit having a housing within the filter media and a tubular rod extending through the housing and substantially from the clean room to above the filter media, including introducing a test material into the rod at a rod inlet at the down stream side of the media, and releasing the test material onto the upstream side of the media at a rod outlet, while passing air from the upstream side to the downstream side of the media.

BRIEF DESCRIPTION OF THE DRAWINGS

The invention will be further described in conjunction with the attached drawings in which.

DETAILED DESCRIPTION

Figure 1:
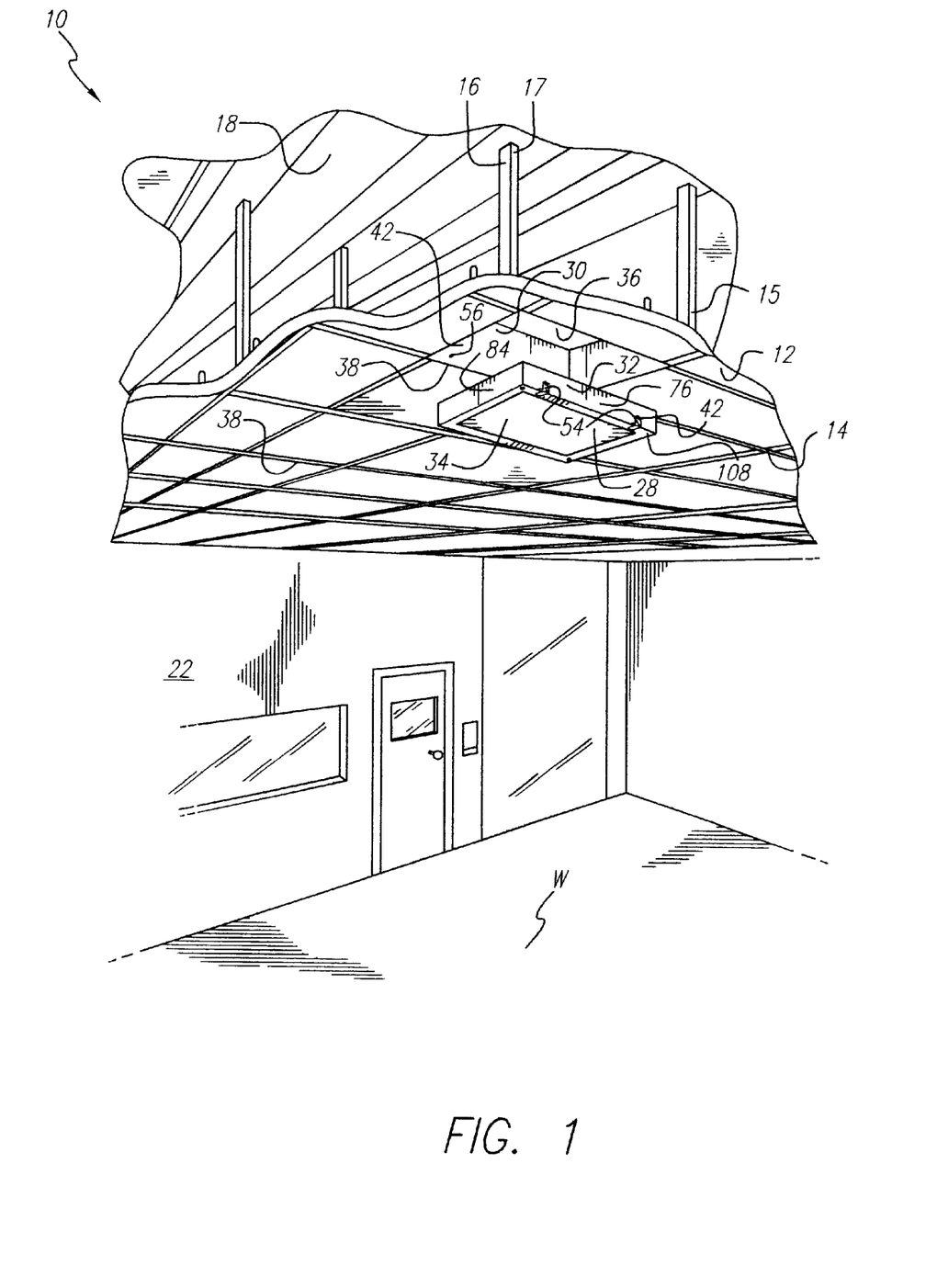
FIG. 1 is an oblique view of the invention clean room ceiling with the filter separated to show the fasteners.
Figure 2:
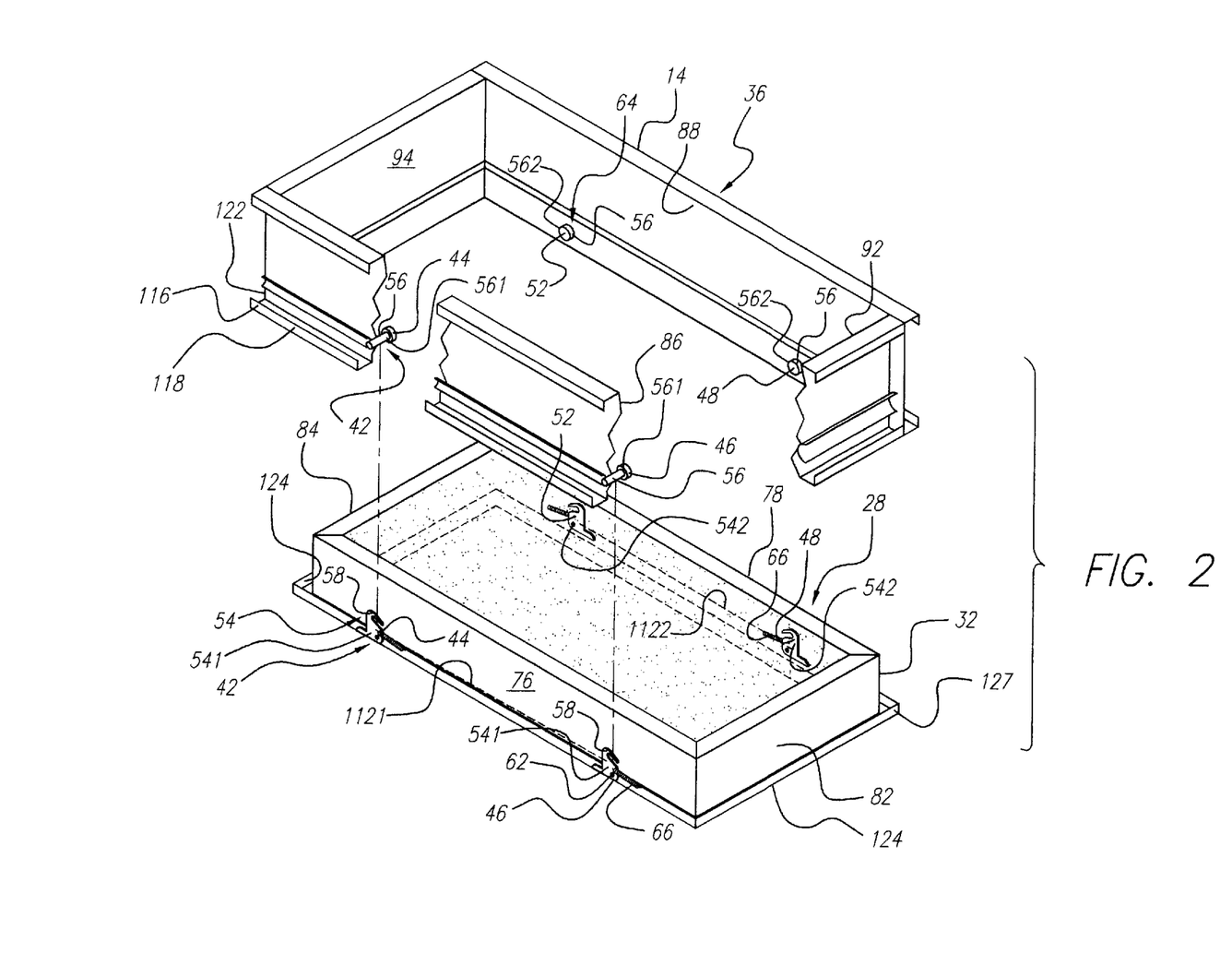
FIG. 2 is an exploded view of the invention filter unit and receiving unit support structure.
Figure 5A:
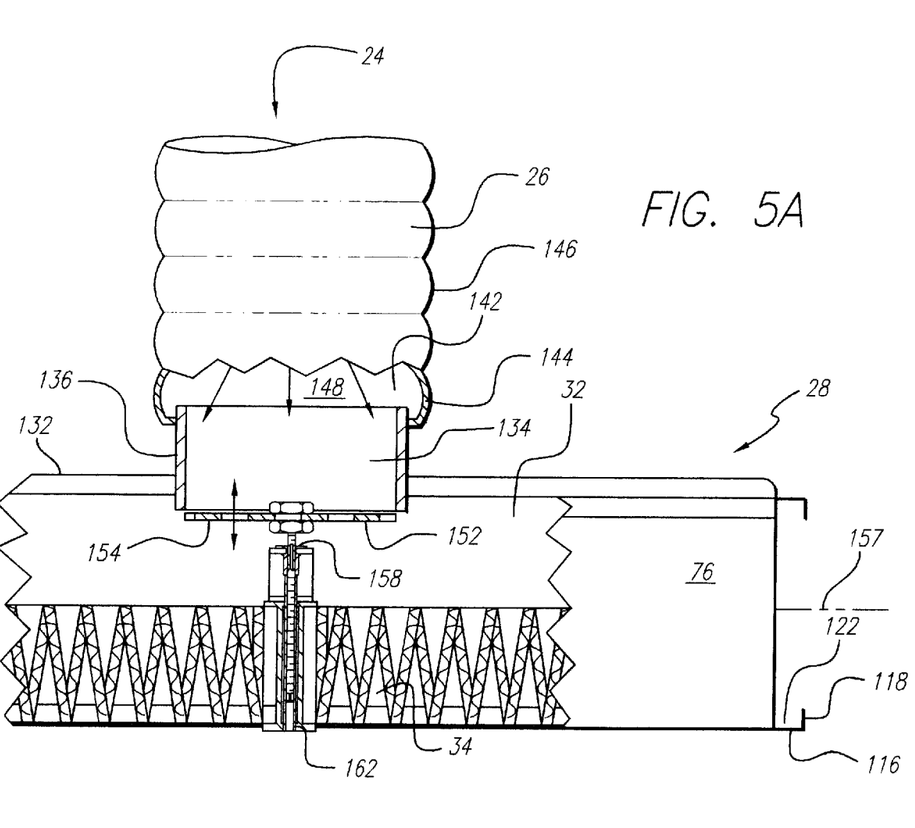
FIG. 5A is a side elevation view, partly in section, of the filter unit equipped with a damper and damper adjustment features.

With reference now to the drawings in detail, in FIGS. 1 and 5A a first illustrative embodiment of the invention has the invention clean room ceiling system generally indicated at 10. The system 10 comprises a dropped ceiling 12 of horizontally disposed and laterally and longitudinally extended filter unit support 14 including support structures 30 carried at the lower ends 15 of vertically disposed hangers 16 that are attached at their opposite upper ends 17 to the room true ceiling 18. Any other suitable form of vertical or horizontal support can be used. The filter unit support structures 30 are arranged to overlie the closed space room 22 and the workspace W therein. The function of the ceiling system 10 is to introduce HEPA or UPLA standard air or other highly filtered air to workspace W, the air being typically received for filtering from an air supply 24 indicated by flexible conduit 26 (FIG. 5).

The clean room ceiling system 10 further includes one or a plurality of filter units 28 that have a predetermined shape, here shown as rectangular, and that comprise a frame 32 and filter media 34 sealed within the frame. The filter unit support structures 30 are congruent with and closely fit the filter unit frames 32 so as to support the filter units 28 to one side of the workspace W.

In one aspect the invention provides a rapid-acting, secure, and easily reversed, superior form of mounting attachment of the filter units 28 to the filter unit support 14. As particularly shown in FIGS. 1–4, the filter unit support 14 includes individual or grid-arranged support structures 30 typically comprising a housing or receiver 36 that defines a receptacle or a series of receptacles 38 for receiving and mounting the individual filter units 28, plural sets of paired cooperating latch and keeper fasteners 42 carried by the filter unit frame 32 and the filter unit support receivers 36. The fasteners 42 comprise opposed (and in registerable relation) pairings 44, 46, 48, 52 to function as an assembly of a latch 54 and a pin 56.

Figure 3A:
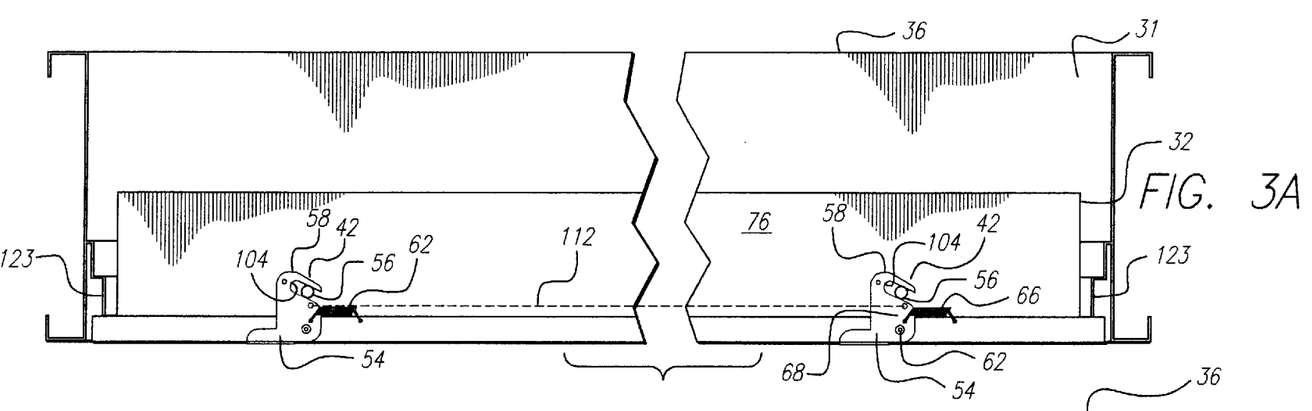
FIG. 3A is a fragmentary detail view in elevation of the filter unit side with attached pivoting latch in pin engagement.
Figure 3B:
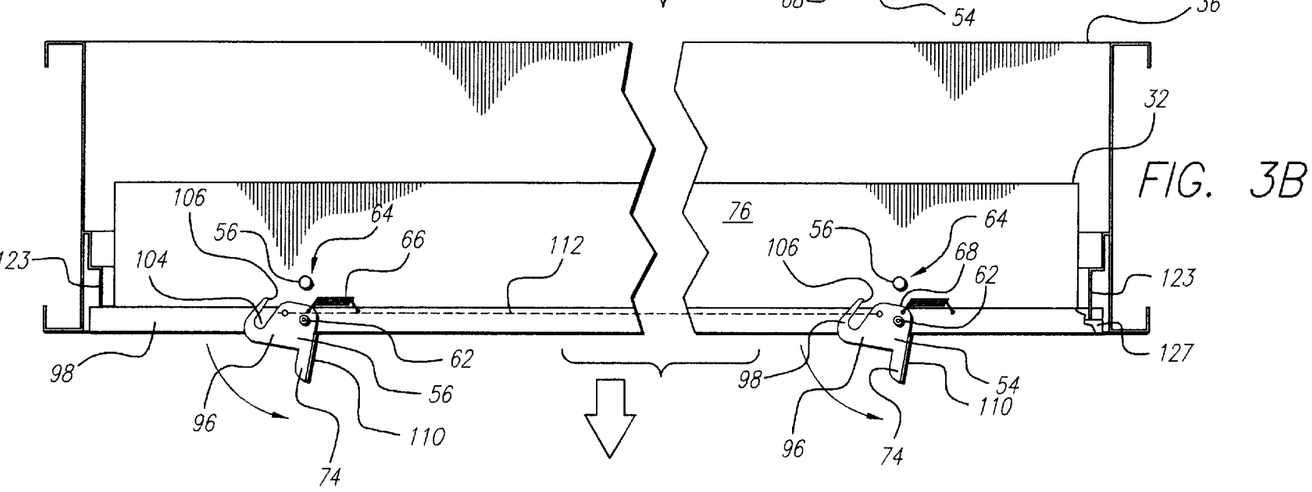
FIG. 3B is a view like FIG. 3A with the attached pivoting latch pivoted away from the pin.
Figure 3C:
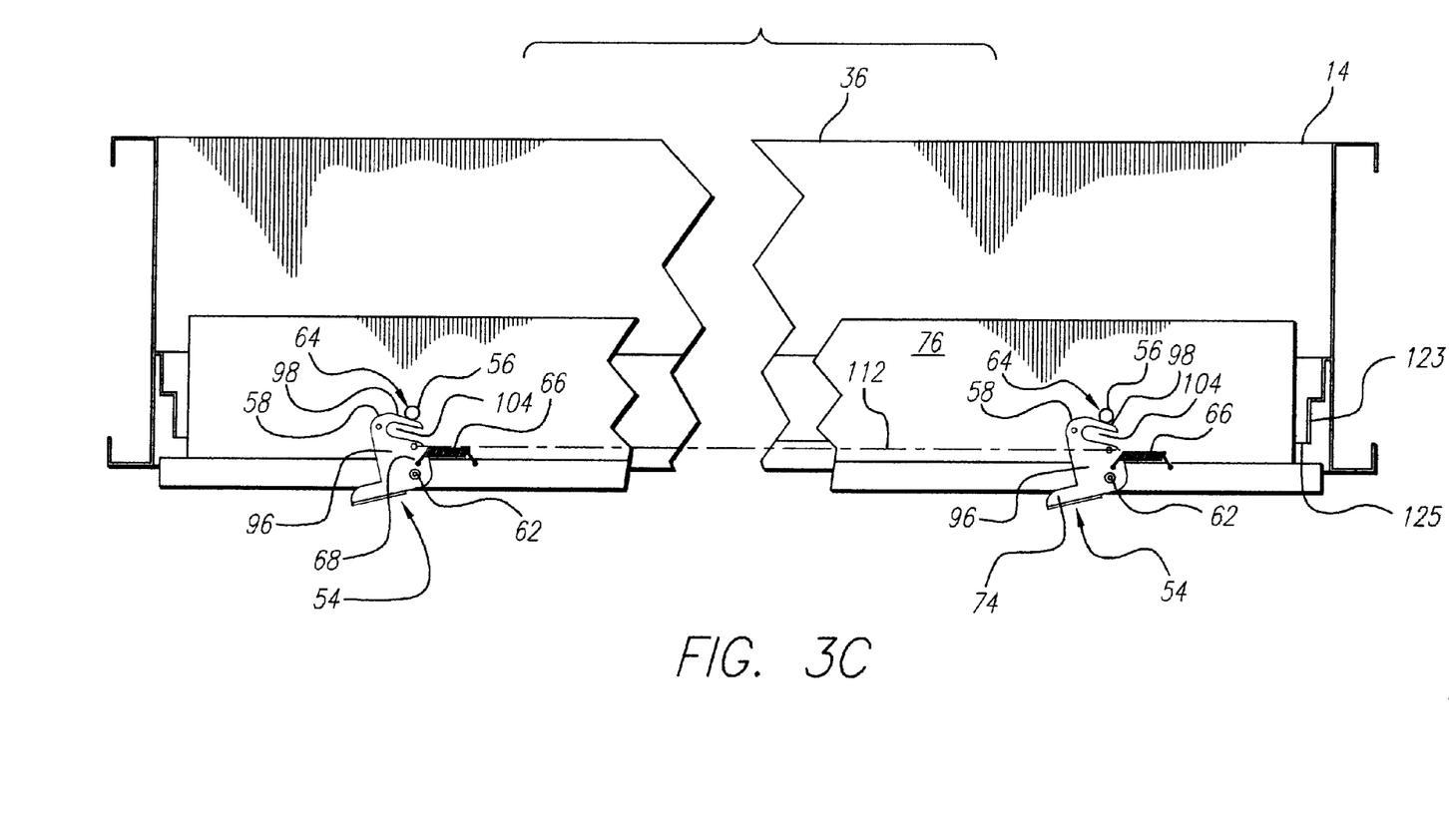
FIG. 3C is a fragmentary detail view in elevation of the filter unit and the support structure, the latches on each side being tethered together with a common tether.
Figure 4:
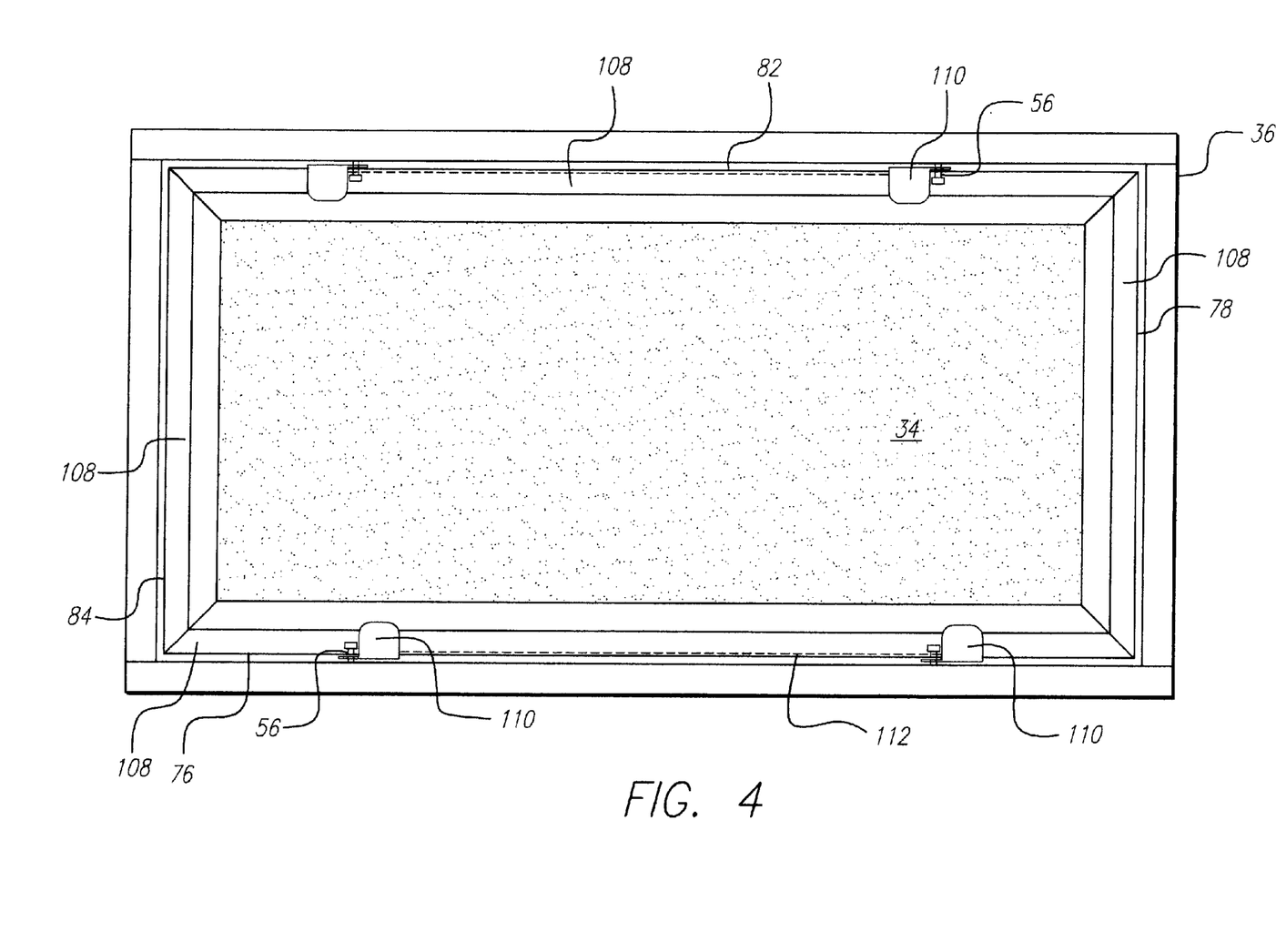
FIG. 4 is a bottom plan view of the filter unit and support in assembled condition as typically viewed from the workspace.

With reference to FIGS. 3A, 3B and 3C, each latch 54 (shown closed in FIG. 3C), has a leading shoulder 58 by which the latch is deflectable in pivoting relation on pivot 62. Pivoting is caused by cooperating keeper 64 shown in the form of pin 56. Upon engagement of the keeper pin 56 with the latch leading shoulder 58, the latch pivots so as to pass the keeper pin (see FIGS. 2, 3A and 3C). Tension spring 66 biases each latch 54 against the keeper pin 56-caused deflection. Tension spring 66 is coupled between latch portion 68 and the filter unit frame 32 so as to be adjacent to and offset from the pivot locus 62. Thusly mounted, the spring 66 tends to keep the latch engaged with cooperating keeper pin 56. Each latch 54 by virtue of its mounting and spring-loading as described is adapted to return to an undeflected position (FIGS. 2, 3A) in keeper pin 56-engaged relation to block separation of the filter unit 28 from the filter unit support receiver 36 after the latch passes the keeper pin.

The latch 54 further has a trailing shoulder structure indicated at 74 by which the latch is reversely deflectable to disengage from the keeper pin 56. Preferably reverse deflection is effected from outside the filter unit support receiver 36 as hereinafter set forth. The reverse deflection of the latch 54, suitably from within the workspace W, releases the filter unit 28 from the filter unit support receiver 36 and permits lowering of the filter units 28 from the support receivers 36.

In the embodiment shown in FIGS. 1–4, the filter unit frame 32 defines four outward facing sides 76, 78, 82 and 84. Preferably two, but as many as four of the sides 76–84 carry one or more latches 54 (or keeper pins 56) each in latching relation with a mating keeper (or latch) respectively carried by the filter unit support receiver 36. A filter unit support receiver 36 is disposed circumjacent to each filter unit frame 32. Each receiver 36 has four inward facing sides 86, 88, 92, 94 corresponding to the four outward facing sides 76–84 of the filter unit 28, the inward facing sides being arranged to be opposite each of the respective filter unit outwardly facing (latch 54 or keeper pin 56-carrying) sides. Thus, at least two but as many as four the filter unit support receiver inward facing sides 86–94 carry one or more keeper pins 36 (or latches 54) in latching relation with a latch (or keeper) carried by the filter unit receiver outward facing sides 76–84 in latch registerable relation.

Preferably, oppositely facing, longer sides 76, 78 of the filter unit frame 32 each carry a pair or set of spring-loaded latches 54. The keeper pins 56 project into the receiver interior 37 and extend normal to the receiver inward facing sides 86, 88 to oppose the latch shoulders 58. Each latch 54 is mounted (at pivot 62) to its respective outward facing side so as to pivot in a plane parallel to the filter unit side (76, 78) carrying the latch. Latch leading shoulder 58 contacts the opposing keeper pin 56 at a point on the shoulder 58 that will deflect the shoulder away from the pin 56, and cause the latch to pivot.

Each latch 54 is preferably hook-shaped, having a body portion 96 that is pivoted at pivot 62, an arm portion 98 extending from the body portion. Arm portion 98 defines the latch leading shoulder 58. Arm portion 98 is spaced from the latch body portion 96 a small distance so as to define a keeper pin 56-receiving slot 104 that travels arcuately upon rotating deflection of the latch 54. Arm portion 98 in a deflected orientation or condition is arranged and sized to pass the keeper pin 56, and to engage the keeper pin 56 by receiving the pin in slot 104 in the non-deflected orientation or condition of the latch 54 and its arm portion, as shown in FIG. 3A.

Arm leading shoulder 58 has a cam-shape, as shown, with its axis of revolution offset from the pivot 62, or any other shape that will rotatingly drive the latch 54 about its pivot locus when the shoulder is engaged with the keeper pin 56. The curvature of leading shoulder 58 is such that contact of the leading shoulder with the keeper pin 56 tips the latch in a manner to position the slot mouth 106 for entry of the keeper pin 56 into slot 104.

Each of the filter unit sides 76–84 has a front face 108 that extends normal to the sides and faces the workspace W. Each latch 54 preferably has, in the illustrated embodiment, a flange 110 extending at a right angle from the trailing shoulder 74 of latch body portion 96. Flange 110 separably engages the side front face 108 and serves to block overrotation of the latch 54 under the biasing force of spring 66, and as well provides a finger hold for rotating the latch from within the workspace W.

For purposes of facilitating the reverse rotation together of each latch 54 to disengage the latches from keeper pins 56, the latches are preferably connected with a link bar or cable shown as tether 112. Tethers 112 are suitably secured to latch portion 68 and are of a length and arrangement suitable for simultaneously pivoting two or more of the latches 54 in a set from their pin 56 engagement. The tether 112 is actuated by rotation of one of the coupled latches 54 by its flange 110 accessible from within the workspace W so that the reversal of the filter unit 28 latching is readily effected by pulling the room-exposed flange 110 on one of the latches and thereby simultaneously shifting from pin 56 engagement the other latch or latches coupled by the tether 112 to the one latch.

In the arrangement shown, the separate latches in each set or pair of latches 541, 542 on each filter unit frame side, e.g. 76, 78 are connected together by a common tether 112. Alternatively, all latches in a given set of latches for a filter unit 28 or a receiver 36 can be connected with a single tether 112. In each arrangement, it is desirable to provide for sufficient simultaneity of latch actuation by tether 112 that the filter unit 28 is smoothly and predictably released from its receiver 36. The coupling of several latches 54 with a common tether 112 enables a single worker to release and control the filter unit 28 in removing it from the receiver 36 and thus provides a more economical arrangement than systems requiring two or more workers to handle the filter unit removal.

In summary, the present embodiment filter unit frame 32 is rectangular and has first and second pairs of outwardly facing sides 76, 78 having respectively first and second sets of pivoting latches 541, 542 mounted thereon in longitudinally distributed relation along the long axis of the sides. The filter unit support 14 includes first and second sets of keeper pins 561, 562 also longitudinally distributed and mounted in cooperating relation with the first and second sets of latches 541, 542. First and second tethers 1121, 1122 separately connect the first and second sets of latches 541, 542 respectively for pivoting together latches 541 or 542 within each set in pin 56 separating relation.

The filter unit support structure sides 86, 88, 92 and 94 each have an external U-shaped flange 116 comprising a stub wall 118 extending parallel to the structure side and spaced therefrom across a narrow gap 122. The support structures may also include an internal flange 123 having a knife edge 125 (FIG. 3C) for sealing purposes as explained below. The keeper pin 56 is supported in place by the structure side e.g. 86 and suitably also by the stub wall 118 in gap 122 traversing relation.

The filter unit sides 76, 78, 82 and 84 also have an external U-shaped flange 124 that is perimetrically sized to fit within the filter unit support receiver 36 and shaped as shown to receive the support structure internal flange 123. The flange 124 contains a fluid or solid sealant 127 that is suitably known per se such as a neoprene or other material sealing gasket or a sealing gel for sealing the filter unit 28 to the receiver 36 as the flange knife-edge 125 seals against the sealant. Or the sealing of these parts may be by a sealing bead or tape at their locus of abutment. See, for example U.S. Pat. No. 5,871,556 to Jeanseau and Braman, the disclosure of which is incorporated herein by this reference.

Filter unit flange 124 also supports the latch sets 541, 542 by supporting the pivot pin 62 on which the latch bodies 96 rotate. The invention thus provides a unique filter unit 28 for use in clean room ceiling systems comprising a filter unit 28 for mounting in a support 30 supported by a support surface 18. The filter unit has a frame 32 with outwardly facing side walls 76–84 and filter media 34 permanently or replaceably sealed within the frame. The filter unit side walls 76, 78 support cooperating fasteners comprising latches 54 and keeper pins 56 that are adapted to support the filter unit 28 at the support 30 and spaced from the support surface 18.

In this aspect, the invention method includes maintaining the filter unit 28 and filter unit support structure 30 in air filtering relation to workspace W within clean room 22, coupling the filter unit to the support structure with cooperating latch 54 and keeper pin 56 by deflection of the latch upon contact with the keeper to pass the keeper, the latch being adapted to latch onto the keeper once past the keeper in filter unit supporting relation on the support structure, and reversely deflecting the latch 54 by actuating flange 110 and simultaneously deflecting adjacent and coupled latches sharing the tether 112 to disengage the filter unit from the support structure.

Figure 5B:
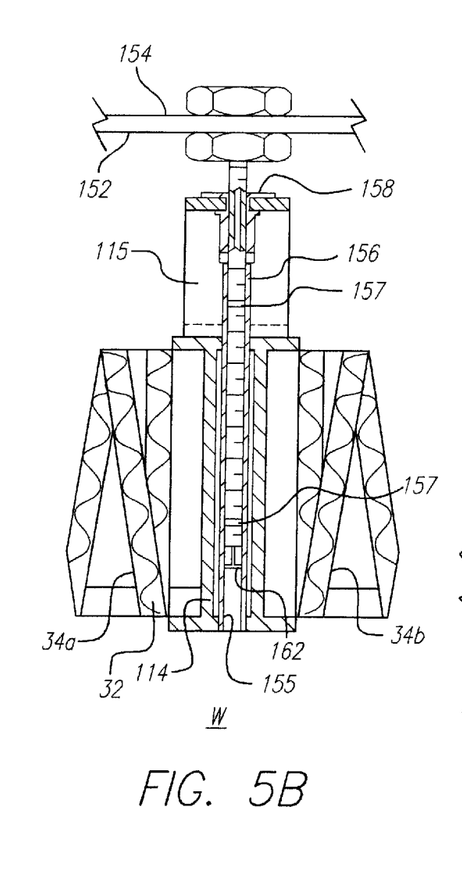
FIG. 5B is a fragmentary, detail view of the filter unit damper and damper adjustment features; and, FIG. 6 is a side elevation view, partly in section, of the filter unit being used to introduce test material into the air flow.
Figure 6:
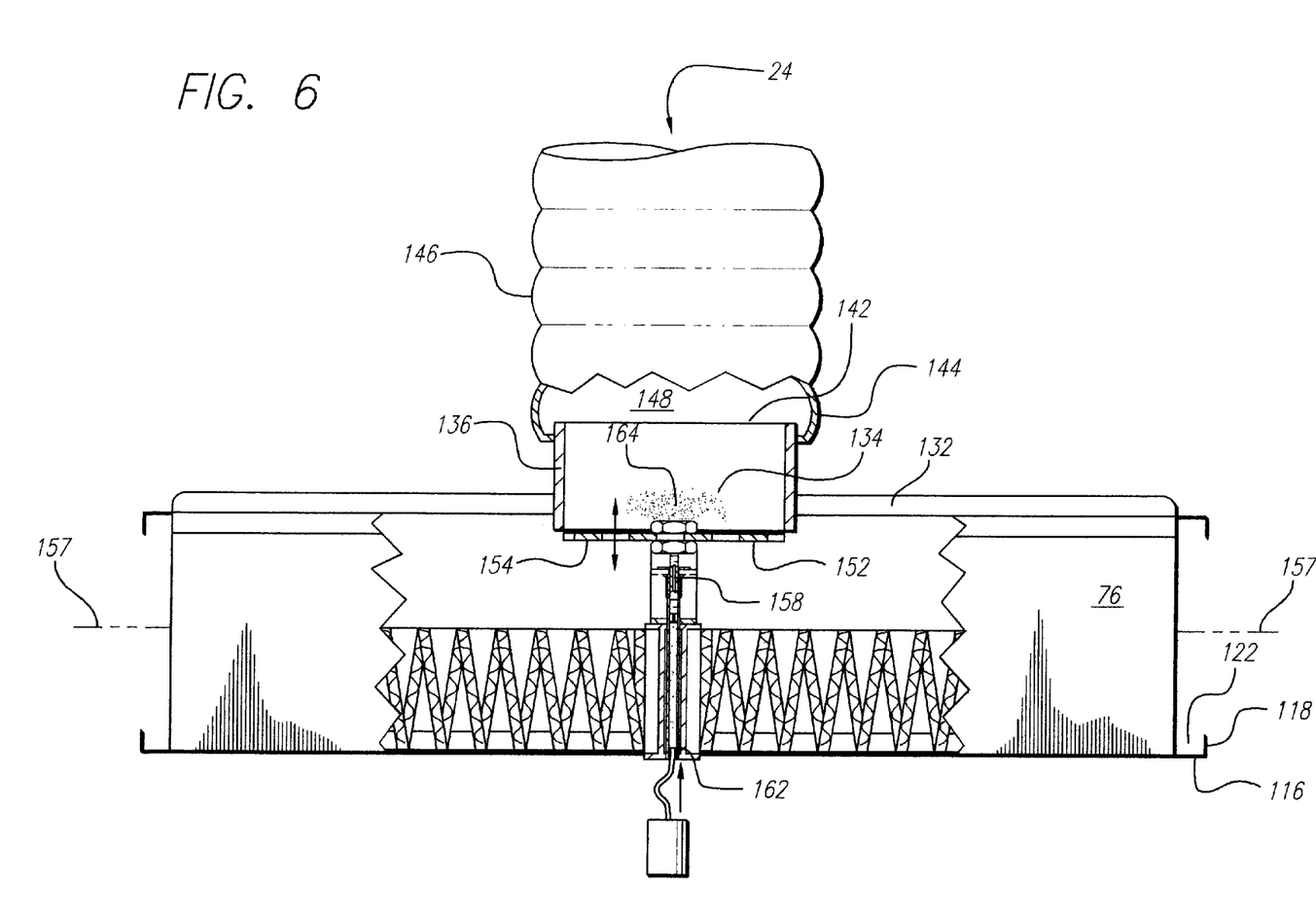

With reference now to FIGS. 5A, 5B and 6, the invention also provides an apparatus for and method of testing high efficiency particulate air filtering media in a filter unit mounted in a clean room including introducing a test material into a rod at a rod inlet at the down stream side of the media, and releasing the test material onto the upstream side of the media at a rod outlet, while passing air from the upstream side to the downstream side of the media.

In this embodiment, with reference to FIGS. 5A and 5B, the filter units 28 and supports 30 are much like those previously described, modified as follows: The filter units 28 are typically separate units but can be in an array where the receiver 36 is one of several in a grid pattern as shown in FIG. 1. The filter units 28 have multiple filter media packs 34a, 34b that are separated by a divider 114 and sealed into the frame 32. A bracket 115 surmounts the divider 114 and carries a bushing 158. The filter unit 28 further includes an upper cover 132 fixed to the frame sides 76–84. The upper cover 132 has a central opening 134 surrounded by a collar 136. The pressurized air supply 24 to the filter unit 28 communicates with air inlet 142 formed by the outlet 144 of flexible conduit 146. The conduit opening 148 registers with the inlet collar 136 and is secured thereto in fluid tight relation.

A damper 152 comprising a perforated plate 154 controls the inflow of air from conduit 146. A vertically or axially shiftable rod 156 extends within a tube 155 that is fixed within divider 114. O-rings 157 seal the rod 156 in the tube 155. Rod 156 is journaled and supported by bushing 158 fixed to the bracket 115. Rod 156 carries the damper plate 154 and extends within the tube 155 in the divider 114 from the workspace W to the air inlet 142. Suitably, rod 156 is threaded to threadedly advance through threaded bushing 158 supported above the plane 157 of the filter media 34a, 34b for adjusting vertically with reference to the fixed bushing by rotation with a screwdriver or other tool acting on the workspace W-exposed lower end 162 of the rod.

Damper 152 is thus shifted more or less to collar 136 by adjustment of the rod 156 in bushing 158 to increase or decrease air flow to the filter unit 28 as needed to balance the air flow across the filter unit or among plural filter units in an array. The ability to adjust the damper 152 setting from within the workspace W is a signal advantage of this embodiment of the invention. A further feature is the integration of the damper 152 and the rod 156 into the filter unit 28 so that each replacement filter unit brings the entire assembly for convenience and lower cost.

In a further embodiment, shown specifically in FIG. 6, rod 156 is made tubular. A test material 164 such as an aerosol challenge mist of appropriately sized particles for testing a HEPA or ULPA filter efficiency is injected from supply 166 or otherwise expressed into the rod 156 from below the filter media 34a, 34b for delivery into the pre-filter media airstream upstream of and on top of the filter media in the filter unit 28 from within the workspace W. Material 164 passing through the media 34 is measured to test the filter unit 28. This ability to conduct testing without having an operator go above the filter units is an important advantage of this embodiment of the invention.

The invention thus provides an improved clean room ceiling system having an integrated filter unit and support structure that preserves the ultimate qualities of present clean room ceiling design, but adds the dimension of ease of installation and removal. Cooperating fastener components on the filter units and support structure enable snap-in installation, and snapout removal, typically by a single worker for even unwieldy size filter units. The invention offers a common unlatching system for one, several or all of the cooperating fastener components. The invention provides in one embodiment a room side replaceable filter system in which individual filter units equipped with cooperating pivoting latches are insertable into supports carrying cooperating pins that serve to pivotally deflect the latches to pass and then upon a spring-powered return engage in hooked relation the pins against separation of the filter unit from the support, the latches being reversely pivotable to pass the pins in filter unit releasing relation from the support by a tether shifting of the latches. The invention further provides a rod element within the filter units to which a damper plate is mountable in the incoming air flow, the element being rotatable to adjust the proximity of the damper to the air flow inlet and thus to modify the air flow. The same rod element when tubular is used to inject a test material into the air flow above the filter media for testing of the efficiency and integrity of the filter unit.

What is claimed is:

1. A clean room ceiling system for a clean room comprising a generally closed space having a workspace and an air supply thereto, said system including a filter unit having a predetermined shape and comprising a frame and filter media sealed within said frame, and a filter unit support adjacent said frame for supporting said filter unit adjacent said workspace, said filter unit support comprising plural sets of cooperating latch and keeper fasteners carried by said filter unit frame and said filter unit support, each said latch having a shoulder by which said latch is deflectable in pivoting relation by its said cooperating keeper to pass said keeper, each said latch being mounted to pivot in a plane parallel to said filter unit side carrying said latch, each said latch being biased against said deflection and adapted to return to an undetected position in keeper-engaged relation to block separation of said filter unit from said filter unit support after passing said keeper.

2. A clean room ceiling system for a clean room comprising a generally closed space having a workspace and an air supply thereto, said system including a filter unit having a predetermined shape and comprising a frame and filter media sealed within said frame, and a filter unit support adjacent said frame for supporting said filter unit adjacent said workspace, said filter unit support comprising plural sets of cooperating latch and keeper fasteners carried by said filter unit frame and said filter unit support, each said latch having a shoulder by which said latch is deflectable in pivoting relation by its said cooperating keeper to pass said keeper, each said latch being biased against said deflection and adapted to return to an undeflected position in keeper-engaged relation to block separation of said filter unit from said filter unit support after passing said keeper, said latch being spring-loaded and mounted for pivoting movement, said latch having structure by which said latch is reversely deflectable from outside said filter unit support to disengage from said keeper and release said filter unit from said filter unit support. said latch structure being accessible from within said workspace.

3. The clean room ceiling system according to claim 1, in which said filter unit frame defines a plurality of outward facing sides, at least two of said sides carrying a latch or keeper in latching relation with a keeper or latch respectively carried by said filter unit support.

4. The clean room ceiling system according to claim 1, in which said filter unit frame defines a plurality of outward facing sides, said support is disposed circumjacent to said filter unit frame and has a plurality of inward facing sides opposite each of said filter unit outwardly fading latch or keeper carrying sides, said inward facing sides carrying a latch or keeper in latching relation with a keeper or latch respectively carried by said outward facing sides in latch registerable relation.

5. A clean room ceiling system for a clean room comprising a generally closed space having a workspace and an air supply thereto, said system including a filter unit having a predetermined shape and comprising a frame and filter media sealed within said frame, and a filter unit support adjacent said frame for supporting said filter unit adjacent said workspace, said filter unit support comprising plural sets of cooperating latch and keeper fasteners carried by said filter unit frame and said filter unit support, each said latch having a shoulder by which said latch is deflectable in pivoting relation by its said cooperating keeper to pass said keeper, each said latch being biased against said deflection and adapted to return to an undeflected position in keeper-engaged relation to block separation of said filter unit from said filter unit support after passing said keeper, said filter unit frame defining a plurality of outward facing sides, said support being disposed circumjacent to said filter unit frame and having a plurality of inward facing sides opposite each of said filter unit outwardly facing latch or keeper carrying sides, said inward facing sides carrying a latch or keeper in latching relation with a keeper or latch respectively carried by said outward facing sides in latch registerable relation, each said filter unit frame outward facing side carrying a spring-loaded latch, said latch shoulder being a leading shoulder, each said latch pivoting in a plane parallel to said filter unit side carrying said latch, said inward facing support sides each carrying a keeper opposite each said latch, each said keeper comprising a pin projecting normal to said filter unit support and arranged to engage said latch leading shoulder in deflecting relation, said latch being hook-shaped to capture said pin following said latch shoulder passing said pin in filter unit supporting relation on said pin.

6. The clean room ceiling system according to claim 5, in which said filter unit sides carrying said latches have a front face normal to said sides and facing said workspace, each said latch having a trailing shoulder having a flange arranged to separably engage said side front face in the latched condition of said filter unit in said filter unit support.

7. The clean room ceiling system according to claim 6, including also a tether secured to each said latch structure for simultaneously pivoting multiple ones of said latches from pin engagement by pivoting one said latch, said tether being accessible from within said clean room.

8. The clean room ceiling system according to claim 7, in which sets of said latch structures are tethered by a common tether for simultaneous pivoting from pin engagement by said tether.

9. The clean room ceiling system according to claim 8, in which said filter unit frame is rectangular and has first and second pairs of outwardly facing sides, said first and second pairs of sides having respectively first and second sets of pivoting latches mounted thereon in longitudinally distributed relation, said filter unit support having first and second sets of pins mounted thereon in cooperating relation with said first and second sets of latches, first and second tethers separately connecting the members of said first and second sets of latches respectively for pivoting together each of the latches within each set in pin separating relation responsive to the pivoting of one latch within the set.

10. The clean room ceiling system according to claim 8, in which said filter unit support structure sides have an external U-shaped flange comprising a stub wall extending parallel to said structure side and spaced therefrom across a gap, said pin being supported in place by said structure side to project into the interior of said support structure.

11. The clean room ceiling system according to claim 10, in which said filter unit supported latch comprises a latch member pivoted on said filter unit side, said latch member comprising a blade defining at one end said latch leading shoulder and at the other end a flange defining said latch trailing shoulder, and defining a pivot locus between said ends, said latch member blade engaging said pin within said support structure interior.

12. The clean room ceiling system according to claim 11, in which said filter unit sides have a U-shaped flange opposing said support structure interior, said filter unit side flanges carrying said latches in pin registered relation.

13. The clean room ceiling system according to claim 11, including also a tether connected between adjacent latches for pivoting said latches together from pin engagement, sets of latches being tethered to a common tether for simultaneous pivoting from pin engagement of each member of a set of latches upon pivoting of any member of the set.

14. The method of mounting filter units in a clean room ceiling system including maintaining a filter unit and filter unit support structure in air filtering relation to a workspace, said support structure having a wall, said air filter unit having an opposing wall to said support structure wall, and coupling said filter unit to said support structure with cooperating latch and keeper structure including a latch that is pivotable in a plane that is parallel with said air filter unit wall and deflectable upon contact with said keeper to pass said keeper and shaped to latch onto said keeper once past said keeper in filter unit supporting relation on said support structure.

15. The mounting method according to claim 14, including also reversely deflecting said latch to disengage said filter unit from said support structure.

16. A clean room filter comprising a filter unit for mounting in a support supported by a support surface said filter unit having a frame with outwardly facing side walls and filter media sealed with said frame, said side walls and support defining cooperating fasteners comprising a latch pivotable in a plane parallel to the plane of said side walls and a keeper adapted to support said filter unit at said support and spaced from said support surface.

17. The clean room filter according to claim 16, in which said filter unit side walls carry latches adapted to engage keepers carried by said support.

18. The clean room filter according to claim 16, in which said filter unit frame defines a plurality of outward facing sides, at least two of said sides carrying a said pivotable latch or a keeper for latching with a keeper or latch respectively carried by a filter unit support.

19. The clean room filter according to claim 18, in which each said filter unit frame outward facing side carries a latch having a leading shoulder and a trailing shoulder, each said latch pivoting in a plane parallel to said filter unit side carrying said latch for latching with an opposing keeper carried by a support.

20. A clean room filter according to claim 16, further comprising multiple packs of filter media, a divider between adjacent packs of filter media supporting a bracket, an air inlet, a rod journaled in a bushing for shifting axially relative thereto, a damper carried on said rod between said air inlet and said filter media pack, said rod being adapted to adjust the position of said damper relative to said filter media packs by a force applied from a clean room in which said filter unit is disposed.

21. A clean room filter comprising a filter unit for mounting in a support supported by a support surface, said filter unit having a frame with outwardly facing side walls and filter media sealed with said frame, said side walls and support defining cooperating fasteners comprising latches pivotable in a plane parallel to the plane of said side walls and keepers adapted to support said filter unit at said support and spaced from said support surface, said filter unit comprising multiple packs of filter media, a divider between adjacent packs of filter media supporting a bracket, an air inlet, a bushing mounted to the bracket, a rod journaled in said bushing for shifting axially relative thereto, a damper carried on said rod between said air inlet and the filter media packs, said rod being adapted to adjust the position of the damper relative to said filter media by a force applied from within the dean room in which said filter unit is disposed.

22. The clean room filter according to claim 21, in which said rod is tubular and extends between said filter media packs and terminates at said air inlet, said tubular rod being adapted to dispense filter test material onto the upstream side of said filter media packs adjacent said air inlet.

23. A clean room filter comprising a filter unit for mounting in a support supported by a support surface, said filter unit having a frame with outwardly facing side walls and filter media sealed with said frame, said side walls and support defining cooperating fasteners comprising latches and keepers adapted to support said filter unit at said support and spaced from said support surface, said filter unit side walls carrying latches adapted to engage keepers carried by said support, each said latch having a structure by which said latch is reversely deflectable from outside said filter unit to disengage from a keeper and release said filter unit from a filter unit support, said latch structure being located to be accessible from within said workspace.

24. A clean room filter according to claim 23, further comprising multiple packs of filter media, a divider between adjacent filter media packs, an air inlet, a tubular rod extending through said divider and terminating at said air inlet, said tubular rod being adapted to dispense filter test material onto the upstream side of said filter media packs adjacent said air inlet.

25. A clean room filter comprising a filter unit for mounting in a support supported by a support surface, said filter unit having a frame with outwardly facing side walls and filter media sealed with said frame, said side walls and support defining cooperating fasteners comprising latches and keepers adapted to support said filter unit at said support and spaced from said support surface, said filter unit frame defining a plurality of outward facing sides, at least two of said sides carrying a latch or keeper for latching with a keeper or latch respectively carried by a filter unit support, each said filter unit frame outward facing side carrying a latch having a leading shoulder and a trailing shoulder, each said latch pivoting in a plane parallel to said filter unit side carrying said latch for latching with an opposing keeper carried by a support, each said latch being generally hook-shaped and adapted to cooperate with a keeper comprising a pin projecting normal to said filter unit, said latch being constructed and arranged such that its leading shoulder engages said pin in deflecting relation and captures said pin following said latch leading shoulder passing said pin in filter unit supporting relation on said pin.

26. The clean room filter according to claim 25, in which said filter unit sides carrying said latches have a front face normal to said sides and facing said workspace, each said latch trailing shoulder having a flange arranged to separably engage said side front face In the latched condition of said filter unit in a support.

27. The clean room filter according to claim 26, including also a tether secured between adjacent latches for pivoting said latches together from pin engagement.

28. The clean room filter according to claim 27, in which sets of said latches are tethered to a common tether for simultaneous pivoting from pin engagement of each member of a set upon pivoting by said tether of any member of a set.

29. A clean room filter comprising a filter unit for mounting in a support supported by a support surface, said filter unit having a frame with outwardly facing side walls and filter media sealed with said frame, said side walls and support defining cooperating fasteners comprising latches and keepers adapted to support said filter unit at said support and spaced from said support surface, said filter unit side walls defining a rectangular frame, said frame having first and second pairs of outwardly facing sides, said first and second pairs of sides having respectively first and second sets of pivoting latches mounted thereon in longitudinally distributed relation for locking on first and second sets of keepers carried on a support structure, and first and second tethers separately connecting said first and second sets of latches respectively for pivoting together each of the latches within each set in pin separating relation.

30. The clean room filter according to claim 29, in which said filter unit supported latch comprises a latch member pivoted on said filter frame side, said latch member comprising a blade defining at one end said latch leading shoulder and at the other end a flange defining said latch trailing shoulder, and defining a pivot locus between said ends.

31. The clean room filter according to claim 30, in which said filter frame sides have a U-shaped flange containing a sealant and adapted to receive a sealing edge of an opposing flange carried by a filter support.

32. The clean room filter according to claim 31, including also a tether connected to each said latch for pivoting with the pivoting of one tethered latch each other latch tethered thereto.

\* \* \* \* \*